United States Patent [19]

Bergmans

[11] 4,028,598

[45] June 7, 1977

[54] DIRECT-CURRENT MOTOR COMPRISING AN ELECTRONIC COMMUTATOR

[75] Inventor: Hendrik Jan Bergmans, Eindhoven, Netherlands

[73] Assignee: U.S. Philips Corporation, New York, N.Y.

[22] Filed: Jan. 7, 1974

[21] Appl. No.: 431,017

Related U.S. Application Data

[63] Continuation of Ser. No. 872,158, Oct. 29, 1969, abandoned.

[30] Foreign Application Priority Data

Nov. 1, 1968 Netherlands .................. 6815585

[52] U.S. Cl. .............................. 318/138; 318/254
[51] Int. Cl.² ...................................... H02K 29/02
[58] Field of Search .......................... 318/138, 254

[56] References Cited

UNITED STATES PATENTS 3,486,099  12/1969  Brunner et al. .................. 318/138

Primary Examiner—G. Dobeck
Assistant Examiner—John J. Feldhaus
Attorney, Agent, or Firm—Frank R. Trifari; Bernard Franzblau

[57] ABSTRACT

A DC motor having a permanent magnet rotor and two Hall effect elements relatively displaced 90° for switching the currents in the stator windings as a function of the rotor position. The stator includes at least two windings. An output transistor for each winding controls the current flow therein and the base currents thereof are supplied from a common source of constant current. First and second control transistors have their base electrodes connected to the output terminals of the Hall elements and their output electrodes coupled to the base electrodes of the output transistors. In any position of the rotor only one output transistor can conduct and each winding can be fully energized at most over an angle of 120°.

3 Claims, 6 Drawing Figures

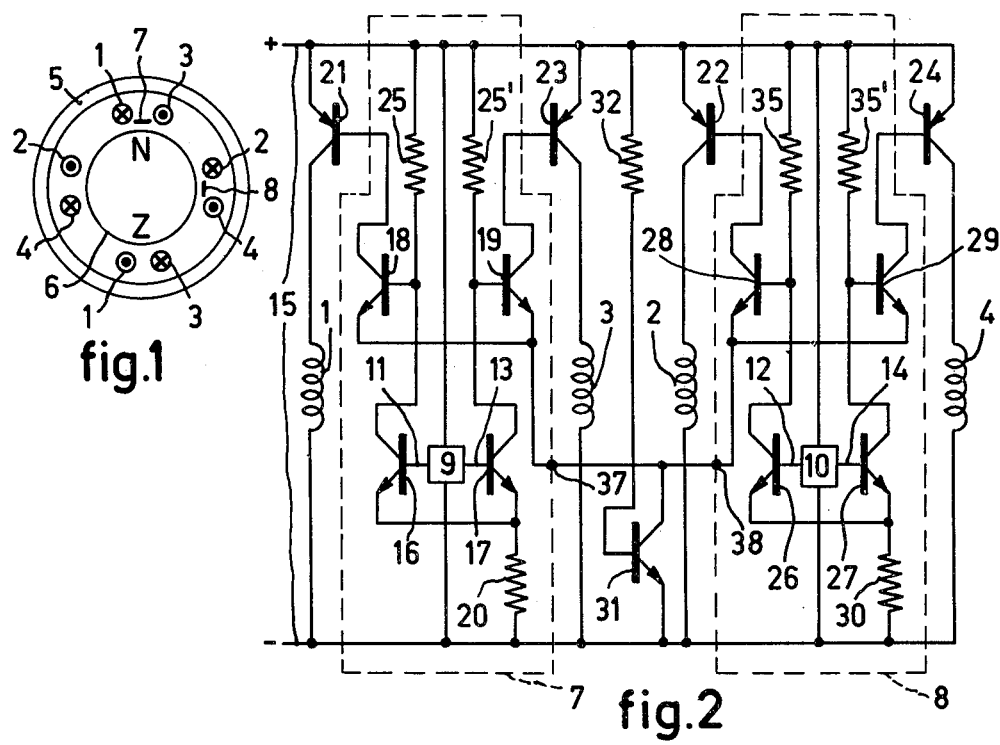
fig.1
fig.2
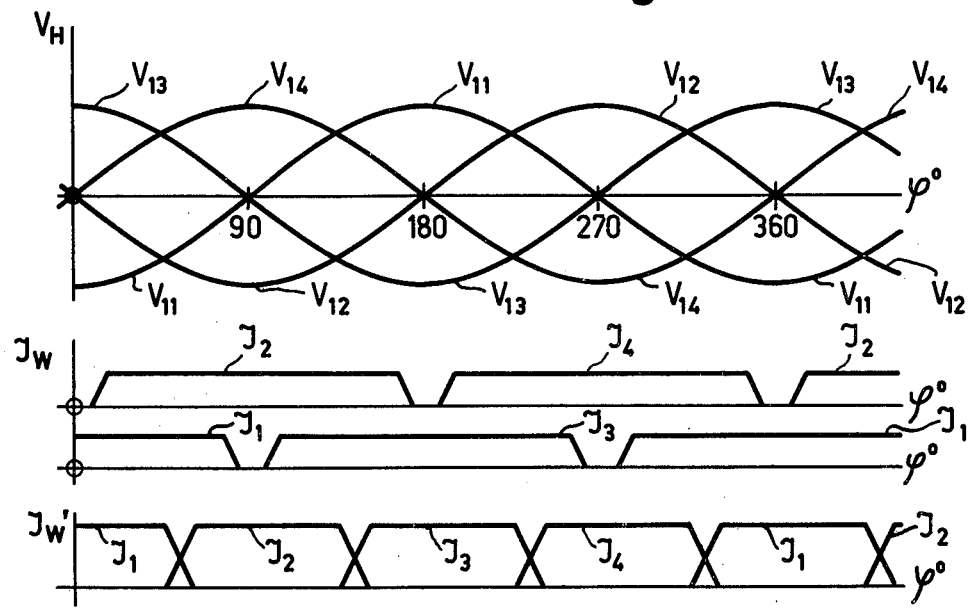
fig.3
INVENTOR.
HENDRIK JAN BERGMANS

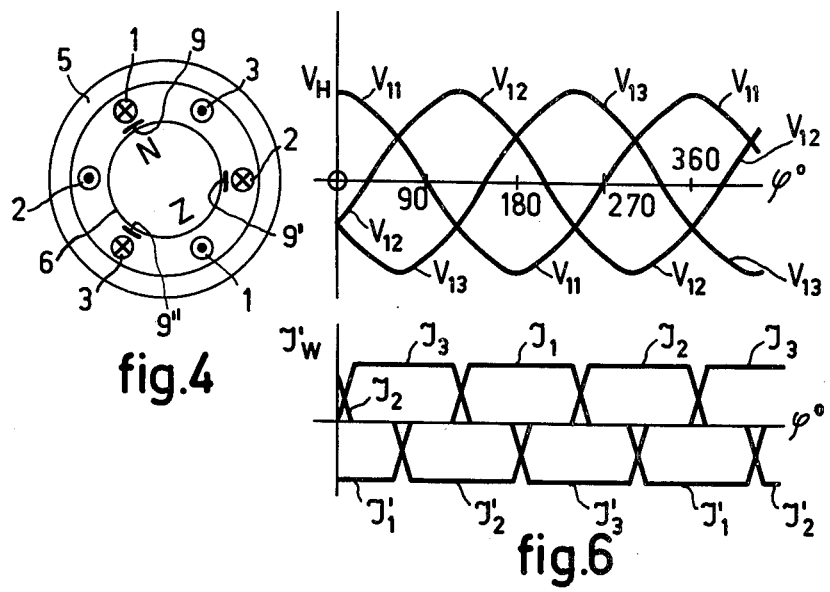
fig.4
fig.6
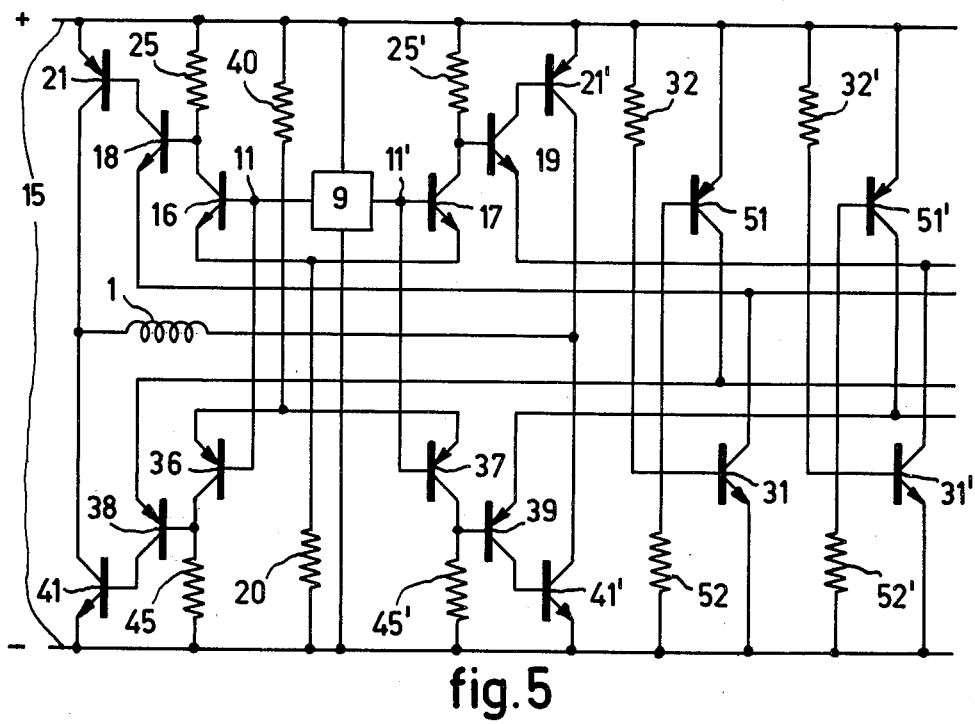
fig.5
INVENTOR.
HENDRIK JAN BERGMANS
BY

DIRECT-CURRENT MOTOR COMPRISING AN ELECTRONIC COMMUTATOR

This is a continuation of application Ser. No. 872,158, filed Oct. 29, 1969, now abandoned.

The present invention relates to a direct-current motor comprising a permanent-magnetic rotor, at least two stator windings and an electronic commutator having the same number of Hall elements fed by a direct voltage and exposed to the field of the rotor. The output terminals of said elements are connected to the base electrodes of transistors so that the current passing through the various stator windings is controlled in dependence upon the position of the rotor.

Such motors are known from "Siemens Zeitschrift" of September 1966, pages 690 to 693 and from the review "ATM" of April 1968, pages 79 to 82.

The voltages produced at the output terminals of the Hall elements have a substantially sinusoidal waveform with a uniformly rotating rotor and the current passed through each winding via the corresponding transistor also has a sinusoidal waveform so that even with only four windings a substantially constant field rotating with the rotor and a substantially constant driving torque are obtained. However, if higher currents are to be handled and if no excessively great power losses should occur in the transistors, intermediate amplifying stages have to be included between the Hall elements and the commutating transistors, the latter being caused to operate as switches. The angular aperture of each commutating transistor is then substantially equal to 180° with a bipolar rotor as that for all practical purposes two stator windings are always simultaneously energized. The resulting field consequently rotates stepwise and the efficiency of the motor is low because the current through each winding is capable of producing very little driving torque over about half of the angle of rotation of, for example, 180° and exhibits nevertheless a practically non-reduced magnitude. In other words, at any given point of the stator the alternating field has a strong third harmonic and also a considerable portion of higher harmonics, especially harmonics of ordinal numbers equal to odd-numbered multiples of three. The current components corresponding to these harmonics bring about losses and do not produce mechanical power.

The invention has for its object to reduce these losses and to provide a motor of the kind set forth with a considerably improved useful effect.

According to the invention the direct-current motor is characterized in that the transistors form as least one group of at least two transistors, the emitters of which are fed from a common source of substantially constant current so that in any position of the rotor only one transistor of each group can be completely conducting and each winding can be completely energized over an angle of at the most 120° with a bipolar rotor in a given direction, in which:

The invention will be described more fully with reference to the drawing

FIG. 1 is a cross sectional view of a first D.C. motor embodying the invention,

FIG. 2 is the electric diagram thereof,

FIG. 3 shows voltage-current angle diagrams for explaining the operation of this embodiment, FIG. 4 is a schematic cross sectional view of a second embodiment, FIG. 5 is the electric diagram of part thereof and FIG. 6 illustrates the corresponding voltage-current angle diagrams.

The D.C. motor shown schematically in FIG. 1 comprises a stator 5 having four stator windings 1, 2, 3 and 4, shifted over 90° relative to each other. Within the stator is a bipolar permanent-magnetic rotor 6. The commutation or distribution of the direct supply current among the windings 1 to 4 is performed with the aid of two integrated circuits 7 and 8 also relatively shifted over 90°. As is shown in FIG. 2, the integrated circuits 7 and 8 comprise Hall elements 9 and 10, respectively, fed from the motor direct-voltage source 15 and exposed to the field of the permanent-magnetic rotor 6. Each of these Hall elements has two output terminals 11 and 13, 12 and 14, respectively, and each integrated circuit comprises furthermore four transistors 16, 17, 18, 19 and 26, 27, 28, 29, respectively, of the npn-type and three resistors 20, 25 and 25', 30, 35, and 35' respectively. The output terminals 11, 13 and 12, 14 are connected to the base electrodes of the transistors 16, 17 and 26, 27, respectively. The emitters of these transistors are connected to the negative terminal of the supply source 15 through a common resistor 20 and 30, respectively, and their collectors are connected to the base of further transistors 18 and 19, respectively, or 28 and, 29 respectively, and to a load resistor 25 and 25' or 35, 35' respectively. The load resistors are connected to the positive terminal of the supply source 15. The emitters of the transistors 18 and 19, 28 and 29, respectively, are connected to a common control-terminal 37 and 38, respectively, of the relevant integrated circuit 7 and 8, respectively, and their collectors form output terminals of these circuits and are connected to the base electrodes of corresponding switching transistors 21 and 23 or 22 and 24, respectively, of the pnp-type. The emitters of these switching transistors are directly connected to the positive terminal of the source 15 and their collectors are each connected to the negative terminal thereof through one of the corresponding stator windings 1, 2, 3 and 4.

The upper diagram of FIG. 3 shows the Hall voltages $V_H$ at the various output electrodes 11, 12, 13, 14 of the Hall elements 9 and 10 as a function of the position $\phi$ of the rotor 6. Each of these voltages is a sinusoidal function of the position $\phi$ and if the current through each of the windings 1, 2, 3 and 4 had a corresponding waveform, the resulting field of these windings would rotate uniformly with the rotator 6 at the same, for example, constant speed $d\phi/dt$ with a leading phase shift of, for example, 90°. Then the control-terminals 37 and 38 could be connected through individual resistors to the negative terminal of the source 15, for example, the emitters of the transistors 16 and 17 and 26, 27, respectively. However, if it is desired to feed the motor, particularly at a low direct supply voltage of, for example, 6 or 12 volts, with a power of more than a few Watts, the transistors through which the current flows to the stator windings must be sperated in the switching mod. This is performed automatically in the motor described since each of the transistors 21, 22, 23, 24 is preceded by two transistor amplifying stages in earth-connected emitter arrangement. Since the inductance of each of the windings 1, 2, 3, 4 has a low impedance at the frequencies concerned, each of the transistors 21, 22, 23, 24 soon gets into saturation so that the currents through the windings 1 and 3, 2 and 4, respectively, exhibit instead of the waveform of half sines that of pulses having more or less sloping leading and trailing edges, as is illustrated for a given speed of rotation of, for example, 10 rev/sec on the second and third lines of FIG. 3 at Iw. The resulting field produced by the currents $I_1$, $I_2$, $I_3$, $I_4$ through the windings 1, 2, 3, 4 no longer rotates uniformly with the protor 6. In the position $\phi = 0°$, only the winding 1 is energized and the field then has a leading phase shift of 90° so that it develops a maximum driving torque. A short time after that the winding 2 is energized so that the leading phase shift is raised to almost 135°. The current $I_2$ at first contributes very little to the driving torque, but this contribution increases up to the position '$\phi = 90°$, whereas the contribution of the current $I_1$ simultaneously decreases and is very slight at the instant when the winding 1 is switched off, shortly before $\phi$ is 90°. Just before this switching instant the field leading angle has dropped to slightly more than 45° and leaps again to 90° after the winding 1 is switched off and then further to almost 135°, when the winding 3 is switched on, which initially contributes very little to the driving torque, and so on.

At any given point along the stator the resulting field has a more or less rectangular waveform as a function of the rotor position $\phi$ or as a function of time so that is comprises a strong third harmonic and a considerable portion of higher harmoncs of ordinal numbers equal to odd-numbered multiples of three. The current components corresponding to these harmonics produce only losses and do not provide useful mechanical power. The considerable improvement in the efficiency by the reduction of the transistor losses obtained by causing the transistors of the final stages to operate in accordance with a switching mode is accompanied by an approximately equally high increase in motor losses so that the efficiency of the assembly is not much improved and sometimes even reduced.

In the embodiment shown an amplifying transistor 18, 19, 28 or 29 is connected between each control-transistor 16, 17, 26, or 27 and the corresponding stator winding 1, 2, 3 or 4, respectively. According to the invention the deterioration of the efficiency of the motor itself is avoided by arranging these amplifying transistors in at least one group of at least two transistors (here one group of four transistors), the emitters of which are fed from a common source of a substantially constant current. In the embodiment described this source of constant current is formed by the series combination of the direct supply source 15 and the emitter-collector path of a transistor 31 of the same npn type as the amplifying transistors 18, 19, 28 and 29. The collector of the transistor 31 is connected to the emitters of these amplifying transistors, while its base electrode is connected through resistor 32 to the positive terminal of the source 15.

By using the common source of constant current 15, 31, 32 and with a correct choice of the angle magnitude of the constant current by appropriate proportioning of the resistor 32, it is achieved that any instant only one of the transistors of the group of amplifying transistors 18, 19, 28 and 29 can be conducting. At the instant $\phi = 0°$, for example, $V_{11}$ has the maximum negative value, the transistor 16 is cut off and the amplifying transistor 18 is conducting so that the current $I_1$ passes through the winding 1, whereas the transistor 17 is held conducting by the maximum positive value of $V_{13}$ and the amplifying transistor 19 is cut off. At the same time the voltages $V_{12}$ and $V_{14}$ are equal to zero so that the two transistors 26 and 27 can be slightly conducting and the amplifying transistors 28 and 29 remain cut off. After a small turn of the rotor, for example, into the position +10°, $V_{12}$ is already negative, $V_{14}$ positive. The amplifying transistor 29 is cut off still more effectively and the amplifying transistor 28 wound otherwise become conducting and the current $I_2$ through the winding 2 would be switched on (second line of FIG. 3). However, it is held in the cut-off state by the voltage drop across the transistor 31, so that the emitter is held positive relative to its base until in the position +45° when $V_{11}$ is exceeded. In this position change-over takes place, the amplifying transistor 28 and the switching transistor 22 becoming conducting, the amplifying transistor 18 and the switching transistor 21 being cut off.

The current $I_1$ through the stator winding 1 becomes fairly abruptly equal to zero, whereas the current $I_2$ through the winding 2 rises as abruptly from zero to its operative value. This desired known change-over is illustrated at $I_w'$ on the last line of FIG. 3. In a corresponding field diagram the field pulses corresponding with the pulses $I_1$ and $I_2$ would be of a first, for example, positive sense, the field pulses corresponding with the pulses $I_3$ and $I_4$ of the opposite, for example, negative sense so that at a fixed point of the stator, for example, corresponding to the position $100 = 0°$ the field is first of a given sense and a given constant magnitude for a time corresponding to one quarter of a revolution of the rotor 6, then zero for a time corresponding to a second quarter revolution, subsequently becoming of the opposite sense and of the same magnitude for a time corresponding to a third quarter revolution and finally being again zero for a time corresponding to a fourth quarter revolution.

By Fourier analysis it can be proved that this waveform comprises a considerably smaller portion of harmonics, particularly of third harmonics and of higher harmonics of ordinal numbers equal to an odd-numbered multiple of three than the conventional rectangular waveform, according to which function, for example, the field vector at a stator point with a given frequency reciprocates between a given, for example, positive value and an equal opposite value. Accordingly the losses in the D.C. motor described are considerably reduced by the use of the source 15, 31, 32 of substantially constant current so that the efficiency may attain a high value, for example, 80%.

The second embodiment shown in FIG. 4 comprises a stator 5 having three stator windings 1, 2 and 3, a bipolar permanent-magnetic rotor 6 and an electronic switching device having three Hall elements 9, 9' and 9'' exposed to the rotor field. Like the windings 1, 2 and 3 the Hall elements are spaced around the motor shaft over angles of 120°.

As shown in FIG. 5 the switching device comprises, for each of the windings 1, 2 and 3, for example, for the winding 1:

two control-transistors 16 and 17 of the npn-type and the two control-transistors 36 and 37 of the pnp-type, whose base electrodes are connected to the output terminals 11 and 11' of the Hall element 9;

a common emitter resistor 20 for the npn-type control-transistors and a common emitter resistor 40 for the pnp-type control-transistors;

four load resistors 25, 25' and 45, 45' for the control-transistors;

two amplifying transistors 18 and 19 of the npn-type and two amplifying transistors 38 and 39 the pnp-type;

and two switching transistors 21 and 21' of the pnp-type and two switching transistors 41 and 41' of the npn-type.

The switching transistors 21, 21' and 41, 41' form a bridge circuit fed via one diagonal from the voltage source 15, the other diagonal being connected to the stator winding 1. This bridge is controlled by the Hall element 9 via the four control-transistors 16, 17, 36 and 37 and the four amplifying transistors 18, 19, 38 and 39 so that it operates as a double change-over switch.

The npn-type amplifying transistor 18 and the corresponding transistors associated with the circuitry for the windings 2 and 3 form a first group of three transistors whose emitters are fed from the source 15 via the emitter-collector path of an npn-transistor 31, whose base is connected via a resistor 32 to the positive terminal of the source 15.

In a similar manner the npn-type amplifying transistor 19 and the corresponding transistors associated with the circuitries of the windings 2 and 3 form a second group of three transistors fed via the collector-emitter path of an npn-type transistor 31' whose base is forwardly biased through a resistor 32'.

Also the pnp-type amplifying transistors 38 and 39 and the corresponding transistors associated with the circuitries of the windings 2 and 3 form two further groups of three transistors each fed via the collector-emitter path of a pnp-type transistor 51 and 51', respectively, whose base is connected via a resistor 52 and 52', respectively, to the negative terminal of the source 15.

By the relative coupling described of the circuitries of the windings 1, 2 and 3 by means of common sources of constant emitter current for each group of amplifying transistors it is achieved that in any sense of current and at any position of the rotor 6 or at any instant only one of these windings can be energized. As is illustrated in FIG. 6 at $I_w'$ only the winding 1 is energized via the transistors 17 and 36 by a "negative" current $I_1'$ in the position $\phi=0°$ or just after it, whereas a "positive" current $I_3$ passes simultaneously through the winding 3. At $\phi=60°$ $V_{11}'$ drops below $V_{12}'$ and the winding 1 is completely switched off, whereas the winding 2 is energized by a negative current $I_2'$. Similarly the winding 3 is switched off at $\phi=120°$, whereas the winding 1 is energized by a positive current $I_1$ and so on. Each of the windings 1, 2 and 3 is thus energized alternately in one sense and in the other for time intervals corresponding to angular rotations of 120° each with intermediate time intervals corresponding to angular rotations of 60° each. Thus the portion of third harmonics and of higher harmonics of ordinal numbers equal to an odd-numbered multiple of three of the field at a given point of the rotor and the current through each of the windings is strongly reduced.

The measure according to the invention is described herein in its application to a motor having a bipolar rotor and a stator having two pairs of windings or three windings. However, it may also be applied to D.C. motors having a permanent-magnetic rotor and any number of pole pairs and a stator having any number of windings or pairs of windings. With a rotor having $n$ pole pairs the angle through which each stator winding is energized (90° or 120°) is divided by $n$. With stator windings energized in one sense and in the other sense, at least two sources of substantially constant current will be employed, one source for each current direction. With $m$ stator windings or pairs of windings each group of transistors fed by the same source of substantially constant current will comprise $m$ transistors or pairs of transistors respectively.

What is claimed is:

1. A direct-current motor comprising a source of direct voltage, a permanent magnetic rotor, at least two stator windings, an electronic switching device haivng the same number of Hall elements energized by said direct voltage and exposed to the rotor field, at least two control transistors, means connecting the output terminals of said Hall elements individually to the base electrodes of the control transistors, means comprising a plurality of amplifying transistors for individually coupling the control transistors to corresponding stator windings so that the current through the various stator windings is controlled as a function of the position of the rotor, characterized in that the amplifying transistors form at least one group of at least two transistors, a source of substantially constant current comprising a transistor of the same conductivity type as the transistors of the associated group of amplifying transistors, means for energizing the emitter electrodes of the amplifying transistors in common from said source of substantially constant current including, means connecting the collector of said transistor to the emitters of the transistors of said group, and means connecting its emitter to one terminal of a source of forward direct voltage and its base electrode to the other terminal of said source through a resistor, whereby in any position of the rotor only one transistor of each group can be fully conducting and each winding can be fully energized over an angle of at the most 120° relative to a bipolar rotor in a given direction.

2. A direct-current motor comprising a source of direct voltage, a permanent magnetic rotor, at least two stator windings, an electronic switching device having the same number of Hall elements energized by said direct voltage and exposed to the rotor field, at least two control transistors, means connecting the output terminals of said Hall elements individually to the base electrodes of the control transistors, means comprising a plurality of amplifying transistors for individually coupling the control transistors to corrresponding stator windings so that the current through the various stator windings is controlled as a function of the position of the rotor, characterized in that the amplifying transistors form at least one group of at least two transistors, a source of substantially constant current, a common emitter resistor that is independent of said constant current source, the output electrodes of each Hall element being connected to the base electrodes of two control transistors of the same conductivity type, means connecting the emitters of said two control transistors via said common emitter resistor to a source of forward direct voltage, and means for energizing the emitter electrodes of the amplifying transistors in common from said source of substantially constant current so that in any position of the rotor only one transistor of each group can be fully conducting and each winding can be fully energized over an angle of at the most 120° relative to a bipolar rotor in a given direction.

3. A DC motor system comprising, a permanent magnet rotor diametrically magnetized, a stator having at least two spatially displaced windings, two Hall effect devices spatially displaced about the stator so as to be exposed to the field of the rotor magnet, a DC voltage supply connected to one pair of terminals of each Hall device, first and second control transistors with their base electrodes individually connected to an output terminal of a Hall device, a common source of constant current, first and second output transistors individually connected in series with said stator windings across the DC voltage supply, means including said common constant current source for supplying base current to said output transistors, and means for individually coupling the base electrodes of said output transistors to the output electrodes of said control transistors so that the current flow in the stator windings is determined by the rotor position in a manner such that only one output transistor can be fully conducting at a time, said coupling means comprising first and second amplifying transistors with their base electrodes connected to the output electrodes of the control transistors and each connected with its emitter-collector path in series with the base-emitter path of an output transistor and said common constant current source, and said common constant current source comprises a transistor with its emitter-collector path in series with the emitter-collector paths of said first and second amplifying transistors and its base electrode connected to a source of forward bias voltage via a resistor.

* * * * *

UNITED STATES PATENT AND TRADEMARK OFFICE
CERTIFICATE OF CORRECTION

PATENT NO. : 4,028,598
DATED : June 7, 1977
INVENTOR(S) : HENDRIK JAN BERGMANS

It is certified that error appears in the above-identified patent and that said Letters Patent are hereby corrected as shown below:

Col. 1, line 33, "as that" should be --so that--;

line 59, ",in which:" should be deleted and --.--(period) should be inserted line 61, after "drawing" there should be --in which:--;

Col. 2, line 50, "rotator" should be --rotor--;

line 60, "sperated" should be --operated--;

Col. 3, line 7, "protor" should be --rotor--;

Col. 4, line 7, "wound" should be --would--;

line 28, "100" should be --∅--;

line 61, "the two" should be --two--;

Claim 1, line 3, "haivng" should be --having--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*